(12) United States Patent
Stenger

(10) Patent No.: US 7,319,748 B2
(45) Date of Patent: Jan. 15, 2008

(54) DEVICE AND METHOD FOR SUPPRESSING ECHO IN TELEPHONES

(75) Inventor: Alexander Stenger, Fürth (DE)

(73) Assignee: NXP B.V., Eindhoven (NL)

(*) Notice: Subject to any disclaimer, the term of this patent is extended or adjusted under 35 U.S.C. 154(b) by 119 days.

(21) Appl. No.: 10/541,418

(22) PCT Filed: Dec. 22, 2003

(86) PCT No.: PCT/IB03/06252

§ 371 (c)(1),
(2), (4) Date: Jul. 1, 2005

(87) PCT Pub. No.: WO2004/064365

PCT Pub. Date: Jul. 29, 2004

(65) Prior Publication Data

US 2006/0153359 A1 Jul. 13, 2006

(30) Foreign Application Priority Data

Jan. 8, 2003 (EP) .................................. 03100016

(51) Int. Cl.
*H04M 9/08* (2006.01)
(52) U.S. Cl. .............................................. 379/406.05
(58) Field of Classification Search ............ 379/406.05
See application file for complete search history.

(56) References Cited

U.S. PATENT DOCUMENTS 6,148,078 A * 11/2000 Romesburg ............ 379/406.07
6,195,430 B1 * 2/2001 Eriksson et al. ....... 379/406.05
2003/0123674 A1 * 7/2003 Boland ........................ 381/66

FOREIGN PATENT DOCUMENTS

WO WO 99/35812 7/1999

* cited by examiner

*Primary Examiner*—Ramnandan Singh

(57) ABSTRACT

The present invention relates to a suppression device for an arrangement for the transmission of audio signals, in particular uttered speech, having: an echo reduction unit (4), which is arranged between an input channel (1) for receiving an input audio signal (A1) coming from a remote end and an output channel (5) for outputting an output audio signal (A2), for suppressing an echo signal contained in the output audio signal (A2), a speech activity detection unit (7) for detecting a speech signal contained in the input audio signal (A1), and, a control unit (6) for setting an echo suppression factor(s) of the echo reduction unit (4) for echo suppression. In order to improve in such a device the quality of the speech signal coming from the near end and at the same time to effectively suppress echoes, while at the same time also keeping echo suppression lowest possible, there is proposed according to the invention to design the control unit (6) in such a way that the echo suppression factor (s) is reduced gradually and continuously from a high echo suppression value set while a speech signal is present in the input audio signal (A1) to a low echo suppression value if the speech activity detection unit (7) detects that the input audio signal (A1) does not contain any speech signal.

9 Claims, 2 Drawing Sheets

DEVICE AND METHOD FOR SUPPRESSING ECHO IN TELEPHONES

Figure 1:
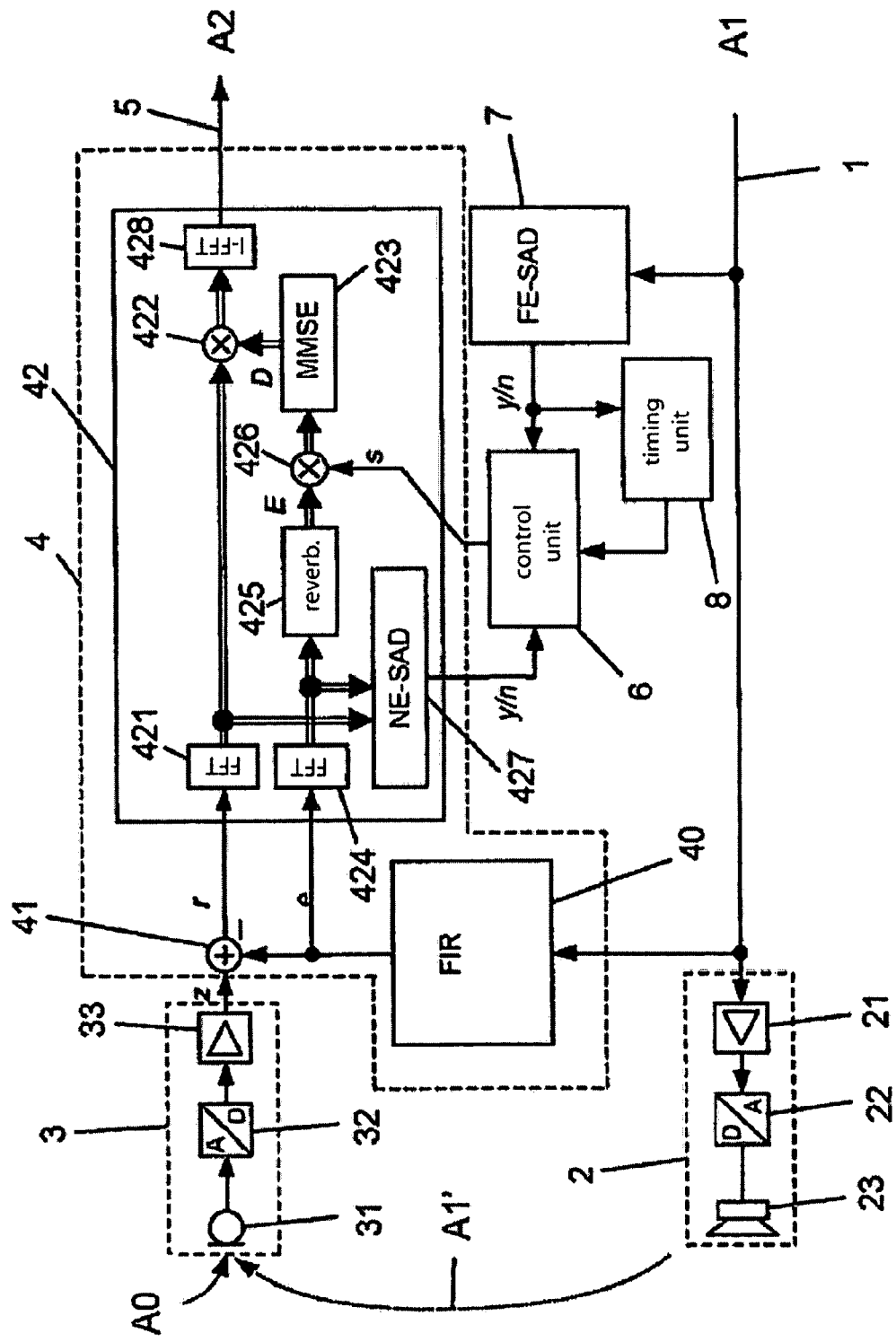

The present invention relates to a device and a corresponding method for suppressing echo for an arrangement for transmitting audio signals, in particular uttered speech, such as for example telephones, having:
  an echo reduction unit, which is arranged between an input channel for receiving an input audio signal coming from a remote end and an output channel for outputting an output audio signal, for suppressing an echo signal contained in the output audio signal,
  a speech activity detection unit for detecting a speech signal contained in the input audio signal, and,
  a control unit for setting an echo suppression factor of the echo suppression unit for echo suppression.

Every telephone has a loudspeaker and a microphone, which are not fully decoupled from one another acoustically, so that echoes may arise which the remote speaker hears at the remote end. This problem arises in particular in the case of hands-free devices, but also in the case of cell phones and cordless telephones due to the small housing size and the relatively large gap between the mouth of the speaker and the microphone. In order to prevent this so-called acoustic echo, various approaches or combinations thereof are used. A half-duplex switch, which attenuates the speaker who speaks with a quieter voice, does allow the reliable suppression of echoes but does not allow speech in both directions at the same time (so-called full-duplex). An echo canceling unit, which subtracts an estimate of the echo signal from the microphone signal, allows full-duplex communication, but echoes are not always suppressed completely therewith. A further possibility is an echo suppresser which attenuates the output signal in the microphone path only when echoes have to be suppressed.

A method and device for controlling echo suppression in a communications system are known from WO 99/35812 A1. In a first embodiment, the acoustic echo suppresser is deactivated if a speech activity detector indicates that the audio signal coming from the remote speaker does not contain any speech component. In a further embodiment, echo suppression is not completely deactivated, but rather is set to a low suppression level, which is sufficient to suppress reverberation.

In the known system, therefore, suppression is immediately switched down if the input audio signal coming from the remote speaker does not contain any speech signal. Initially, however, echoes may continue "on their way" because of reverberation. The remote speaker may thus hear a short echo, after he himself stops speaking or even after so-called explosive sounds, especially after the sounds "t", "k" and "p". Furthermore, especially when starting the system, i.e. at the beginning of a telephone conversation, a further problem may arise if, as is often the case, the echo reduction unit comprises a so-called echo canceling unit with adaptive FIR filter (finite impulse response) filter. At the beginning of the telephone conversation, such a filter is as yet unadapted and no echo cancellation is achieved. The echo reduction of such a FIR filter increases slowly at first and can only adapt as speech continues. The consequence of this is that at the beginning echoes still get through and only after a period of half to one second does echo suppression take full effect.

It is therefore an object of the present invention to provide a device and a corresponding method for effective echo suppression in an audio transmission device, especially a telephone, with which it is intended to prevent the above-described problems, and with which echoes are thus quickly and effectively suppressed especially when the input audio signal coming from a remote end does not contain any speech signal.

This object is achieved according to the invention with a device as claimed in claim 1, which is characterized in that the control unit is so designed that the echo suppression factor is reduced gradually and continuously from a high echo suppression value set while a speech signal is present in the input audio signal to a low echo suppression value if the speech activity detection unit detects that the input audio signal does not contain any speech signal.

A corresponding method for echo reduction is indicated in claim 11. A computer program for implementing the method is indicated in claim 12. Advantageous embodiments of the invention are indicated in the dependent claims.

The invention is based on the discovery that the echo suppression factor should not be abruptly switched down completely to zero or a low value if the input audio signal does not contain a speech signal, but rather it should be switched down gradually and continuously, since otherwise echoes are transmitted due to reverberation if the remote speaker stops speaking or in particular also after so-called plosive sounds. Such disturbing echoes are prevented with the device according to the invention, since the echo suppression factor is reduced only gradually and not abruptly like with the known device at the moment when the remote speaker stops speaking or after a plosive sound, after which a short pause occurs especially at the ends of words. At this point, echoes are thus still suppressed sufficiently to ensure that no reverberation reaches the remote speaker. This leads to substantially more pleasant speech transmission with the device according to the invention.

According to a preferred embodiment, decay from the high echo suppression value to the low echo suppression value is controlled by means of an exponential function. This approximately simulates the true time profile of the echo energy, since this is also known to reduce exponentially over time, and thus results in optimum echo suppression at the stated times.

A preferred function for control of the echo suppression factor at the stated times is indicated in claim 3.

According to a further embodiment, switching down of the echo suppression factor is delayed by a certain dead time, i.e. the high echo suppression value is still set during this dead time and the echo suppression factor is only reduced thereafter. This also allows reverberation to be effectively suppressed. However, such high echo suppression during the dead time is not absolutely necessary and contributes only to an unnecessary impairment of the transmission quality of the audio signal, in particular a speech signal, coming from the near end (or from the near speaker).

In a further embodiment, a further speech activity detection unit is provided for detecting whether the audio signal coming from the near end contains a speech signal from the near speaker. In this case, the control unit is so designed that it sets a moderate echo suppression value when speech signals are present both in the input audio signal and in the audio signal coming from the near end, while only in the absence of a speech signal in the input audio signal is the maximum echo suppression value set. In the first instance, echoes are not completely suppressed; however, the speech signal coming from the near end is transmitted audibly, optionally distorted.

In the device according to the invention, an echo reduction unit is preferably used which comprises an adaptive FIR filter for producing an estimate of the echo of the input audio signal contained in the audio signal coming from the near end. Such a FIR filter is often also used in an echo canceling unit, which does not change the signal coming from the near end. The stated estimate is generally subtracted from the audio signal coming from the near end, before the audio signal coming from the near end is transmitted to the remote end. The power of this echo estimate additionally also serves as an input signal for an echo suppression unit connected downstream of the FIR filter. At the start of communications in particular, i.e. at the beginning of a telephone conversation, such an adaptive FIR filter is as yet unadapted, however, and the echo suppression unit is fed with too small an estimate of the echo power, which results in too little echo suppression. According to the invention, an advantageous embodiment therefore provides for the coefficients of the FIR filter to be initialized to a value not equal to zero at the start of communication, in order to achieve realistic power in the estimate signal, whereby sufficient echo suppression is also achieved in the start phase.

According to a further embodiment based thereon, the echo suppression factor is increased in the start phase in accordance with the initially poor adaptation state of the FIR filter, in order to compensate the excessively low echo cancellation in the start phase. Only gradually is the echo suppression factor then reduced to a static high echo suppression value, for example by means of a timing means, which value is then maintained while a speech signal is contained in the input audio signal. The timing means may be so designed, for example, that reduction to the static high echo suppression value is achieved after approximately 0.5 to 1 second, preferably after approximately 0.8 second. In this way, echoes are prevented with absolute reliability in the start phase, i.e. at the beginning of a telephone conversation. During this time, full-duplex capability, i.e. the ability of the remote speaker to hear if the near speaker wishes to interrupt him or makes a brief comment while the remote speaker is active, is indeed restricted from the near to the remote speaker. However, this is not generally a disadvantage, since in the first seconds of a telephone call double-talk seldom occurs, since each participant generally starts by stating his name or a greeting.

Examples of values for the stated echo suppression values are indicated in further dependent claims.

Figure 2:
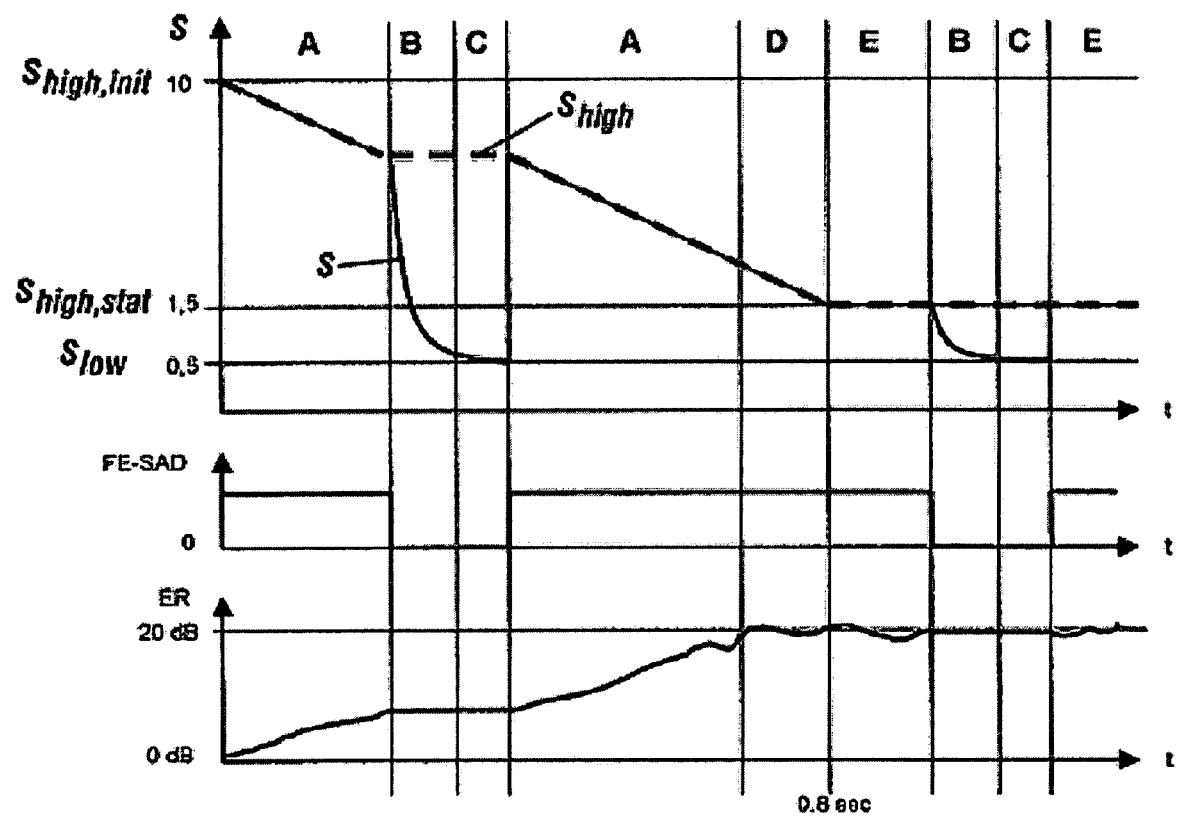
Figure 3:
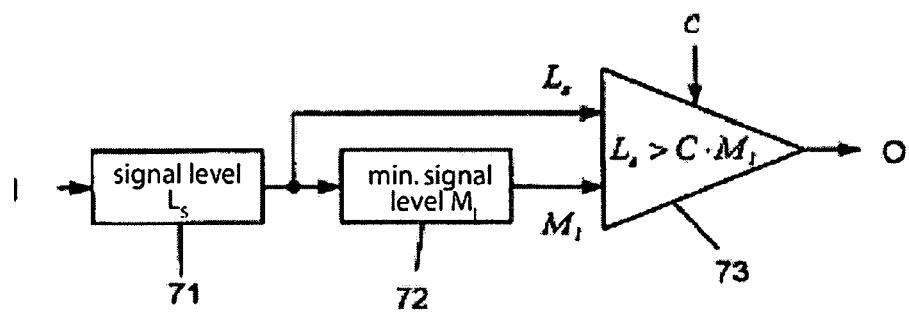

The invention will be further described with reference to examples of embodiments shown in the drawings to which, however, the invention is not restricted. In the Figures:

FIG. 1 is a block diagram of an echo reduction device according to the invention, FIG. 2 shows time profiles of the echo suppression factor and the echo suppression achieved with the device according to the invention and FIG. 3 is a block diagram of a speech activity detection unit used in accordance with the invention.

FIG. 1 is a block diagram of an echo reduction device according to the invention. This is used, in the embodiment illustrated, in an arrangement for transmitting audio signals, i.e. for example in a mobile phone, a hands-free device, a radio or a cordless telephone. An input audio signal A1 coming from a remote end (remote speaker) on an input channel 1 is amplified by a converter 2, which comprises an amplifier 21, a digital/analog converter 22 and a loudspeaker 23, converted into an analog electrical signal and output at the loudspeaker 23. An audio signal A0 coming from a near end (near speaker), which signal may contain both speech and noise, is converted into a digital electrical signal and amplified by a reconverter 3, which comprises a microphone 31, an analog/digital converter 32 and an amplifier 33, optionally together with an echo signal A1' of the input audio signal A1, before it is output as output audio signal A2 for transmission to the remote end (the remote speaker) after appropriate post-processing for echo suppression in the echo reduction unit 4 on the output channel 5.

The echo reduction unit 4 provided according to the invention comprises an adaptive FIR filter (Finite Impulse Response) filter 40, also known as an echo canceling unit, which generates an estimate e of the echo of the input/audio signal A1 contained in the output signal z of the reconverter 3. This estimated signal e is, on the one hand, subtracted from the output signal z of the reconverter 3 by means of a subtracter 41. However, residual echoes may remain in the output signal r of the subtracter 41, on the one hand, because of maladjustment of the FIR filter 40 and, on the other hand, because the FIR filter 40 can only estimate a finite echo duration of approximately 25 milliseconds.

The echo-reduced output signal r of the subtracter 41 is then fed to a post-processing unit 42, known also as an echo suppression unit, which first of all transforms the signal r by means of an FFT unit 421, in particular with 128 points, into the frequency domain. Residual echoes are then suppressed by attenuating frequencies with dominant echo contributions. In contrast, frequencies in which the audio signal A0 coming from the near end dominates are less attenuated. This attenuation is effected in the multiplier 422 by means of a frequency-dependent attenuation function D, which is calculated by means of an attenuation calculation unit 423, which preferably uses the Minimum Mean Square Error (MMSE) method. To this end, a frequency-dependent estimated echo signal E is necessary, which is calculated from the time-dependent estimated echo signal e by FFT transformation by means of an FFT transformation unit 424 acting in the same way as the FFT transformation unit 421. Since the time-dependent estimated echo signal e contains only the early echoes, for example within the first 25 milliseconds, an echo reverberation unit 425 is additionally provided, which adds an estimate of the later echoes, assuming an exponential drop in echo energy.

The degree of echo suppression is controlled by means of an echo suppression factor s, with which the frequency-dependent estimated echo signal E is multiplied in the multiplier 426. A speech activity detection unit 427, which detects from the output signal r of the subtracter 41 transformed into the frequency domain and the estimated echo signal e transformed into the frequency domain, whether a speech signal is contained in the audio signal A0 coming from the near end, passes corresponding information on to a control unit 6. In addition, information as to whether a speech signal is contained in the input audio signal A1 and determined by a further speech activity detection unit 7, is fed to the control unit 6. From this information, and optionally further time information from a timing unit 8, the echo suppression factor s suited to each situation is then calculated in accordance with the method according to the invention, as will be explained below. Once the output signal r of the subtracter 41, transformed into the frequency domain, has been multiplied by the correspondingly calculated attenuation D, it is transformed back into the time domain by means of an inverse FFT transformation unit 428, after which it is then transmitted to the remote end via the output channel 5 as output audio signal A2.

The invention exploits the psycho-acoustic effect that a human listener does not feel stationary signals as echo signals. A simple explanation for this is that the "echo signal" from background noise coming from the remote end sounds like the noise itself, since the spectral portions of noises do not normally change when fed back from the loudspeaker 23 to the microphone 31. In this way, such "echo" is masked by the background noise and is thus not audible. Moreover, "echo" from background noise coming from the remote end sounds like noise coming from elsewhere, e.g. from the near end. A hearer at the remote end would not therefore view such an "echo" really as an echo, even if he could hear it. Echo suppression may therefore be considerably reduced at times when only background noise is contained in the input audio signal A1 coming from the remote end, without the participant located at the remote end being aware of echoes.

According to the invention, the control unit 6 therefore reduces the echo suppression factor s to a low value $s_{low}$ in such situations. However, this reduction is not effected abruptly according to the invention, but rather gradually and continuously, in particular in accordance with the drop in echo energy. Otherwise, a drop in the echo would be audible if the speaker at the remote end were to stop speaking. The control unit 6 makes use, as already indicated above, of the information obtained from the speech activity detection units 427 and 7 as to whether the signal r supplied to the reprocessing unit 42 or the input audio signal A1 contains a speech signal. The behavior, depending on this information, is compiled in the following Table, with k being the frame time and α reproducing the exponential drop in echo energy.

| A1 = Speech signal | A0 = Speech signal | Echo suppression factor s |
|---|---|---|
| No | — | $s[k] = \alpha \cdot s[k-1] + (1-\alpha) \cdot s_{low}$ |
| Yes | Yes | $s[k] = s_{double}$ |
| Yes | No | $s[k] = s_{high}$ |

Typically, the same echo reproduction constant α is also used in the echo reproduction unit 425 for echo estimation. The factor α preferably exhibits a value in the range from 0.5 to 0.99, preferably in the range from 0.75 to 0.85. With a typical frame time k of for example 0.01 second, a value of α=0.8 is advantageous. In general, the factor α may also be described as $\alpha = 10^{(-3 \cdot \text{frame time}/T_{60})}$, with $T_{60}$ being the reverberation time of a typical room (e.g. an office, living room, car).

Control according to the invention markedly improves the quality of the speech transmitted from the near end to the remote end, the presence of a speech signal in the audio signal coming from the near end not being of any significance for determining the echo suppression factor when a speech signal is absent from the input audio signal. Since the presence of a speech signal in the input audio signal may be determined highly reliably by means of the speech activity detection unit 7, relatively small values may be set for the echo suppression factor when there is no speech signal in the input audio signal, which values amount for example to 0.5 or less, without having to take the risk of echoes mistakenly not being suppressed, which likewise contributes to the high transmission quality of a speech signal coming from the near end. Even if both speakers are speaking at the same time, transmission of the speech signal from the near-end speaker may be improved, since the speech activity detection unit 7 may effect switching to the low echo suppression factor $s_{low}$ during short pauses, even within a spoken word, in the speech coming from the remote end.

Switching down to the low echo suppression value $s_{low}$ could also be delayed by a dead time, which, however, produces suppression which is unnecessarily high because it is uniform over the entire dead time, which could amount for example to 0.4 second. It is therefore better to effect the above-described exponential decay from the high echo suppression value $s_{high}$ to the low echo suppression value $s_{low}$. This substantially simulates the true time profile of the echo energy, since this is also known to diminish exponentially over time.

When using an adaptive FIR filter 40, as preferably used in the present case, it has been noted that, especially at the start of communications transmission, i.e. at the beginning of a telephone conversation, the FIR filter 40 is as yet unadapted and therefore no echo reduction from the signal r to z is achieved. The echo reduction of the FIR filter increases only slowly, such that, at the beginning, echoes still get through if the reprocessing device 42 still suppresses in the normal manner. This may be made even worse in that the reprocessing device 42 suppresses echoes proportionally to the power of the estimated echo signal e. If the FIR filter 40 is thus initialized as usual with zero coefficients, this power is initially 0 and reaches the real value of the echo power at the earliest after a delay of approximately half a second.

In order to eliminate this problem, therefore, it is ensured according to the invention that the power of the estimated echo signal e is sufficient during the start phase, by initializing the coefficients of the FIR filter 40 to a value unequal to zero. For example, a coefficient of 1 may be set. In the case of the echo reduction unit 4 of the type used here, the value range of the coefficients is limited to −1 to +1, so that a plurality of coefficients must be preset in order to achieve a realistic power in the estimated echo signal e at the start. It must be ensured that the coefficients represent a broadband system, so that the post-processing unit 42 may also suppress echoes at all frequencies. For example, it is suitable to preset eight successive coefficients of the FIR filter with the values {1, 1, 1, 1, −1, −1, 1, −1}. Thus, 8 times the power is obtained at the start for the estimated echo signal e in comparison to presetting a single coefficient. In addition, a FIR filter preset in this way transmits all relevant frequencies in approximately the same way.

In a preferred embodiment of the device according to the invention, echo suppression is therefore additionally effected by the reprocessing device 42 at the start. The idea is to increase the high echo suppression value $s_{high}$ in accordance with the initially poor FIR adaptation state. To this end, the timing device 8 illustrated may be used, for example. The low echo suppression value, i.e. $s_{low}$, is maintained, since no echoes arise even at the start without remote speech.

FIG. 2 shows the profile of the echo suppression factor s, wherein the profile of the high echo suppression value $s_{high}$ is illustrated in broken lines. In zone A, suppression is sufficiently large to compensate the echo cancellation of the FIR filter, which is too little. In zones B and C, no FIR adaptation takes place due to a lack of speech in the input audio signal, which is indicated by the output signal FE-SAD of the speech activity detection unit 7. Therefore, the high echo suppression value $s_{high}$ is reduced no further in zones B and C; the timing unit 8, which may take the form of a starting time meter for example, thus does not count any further. Furthermore, the timing unit 8 is preferably set so that there is additionally a safety zone D, since the adaptation period may vary as a function of the remote speech. From zone E, the stationary state is achieved, and $s_{high} = s_{high,stat}$ remains constantly at the stationary high echo suppression value.

FIG. 2 also shows the exponential drop in the echo suppression factor s to the low echo suppression value $s_{low}$, provided according to the invention in zones B and C, i.e. when there is no speech in the input audio signal. The bottom diagram of FIG. 2 additionally shows the profile of the echo reduction ER over time. As is clear, after approximately 0.8 second of adaptation time, the necessary accuracy is reliably achieved (in the case of a FIR filter as used here with 200 coefficients). For a given FIR filter length, therefore, the convergence time is known. Where s<4, the reprocessing unit 42 also reacts to slight echoes with maximum suppression. In this case, it behaves like frequency-dependent half-duplex control in the transmit direction, i.e. no echoes get through, but during remote speech the transmit direction is also blocked. When $s_{high,init}$=10, this is the case in zones A. In zone B, suppression is reduced exponentially in accordance with reverberation, and in zone C the transmit direction is unblocked when $s_{low}$=0.5. From zone E, when $s_{high,stat}$=1.5, only the suppression of residual echoes which have not been canceled by the FIR filter is achieved, for which purpose, however, the transmit direction is never fully blocked, i.e. normal behavior is achieved after the initialization phase.

A block diagram of an example of a speech activity detection unit as used according to the invention is illustrated in FIG. 3. Such a unit may detect a speech signal within a signal with stationary background noise. In the embodiment shown, this comprises a unit 71 for determining the signal level $L_s$ measured over a short period, a unit 72 for determining the minimum signal level $M_I$ of the input signal I measured over a longer period together with a comparator 73. This exploits the fact that a speech signal exhibits a strongly time-dependent signal level in comparison to a background noise signal. Whenever the signal level $L_s$ measured over a short period is greater by a factor C, for example C=2 (corresponding to 6 dB), than the minimum signal level $M_I$ measured over a longer period (e.g. 2 seconds), speech activity is detected and a corresponding output signal O is output with this information.

Both the preferably exponential decay from $s_{high}$ to $s_{low}$ and also the control of $s_{high}$ at the start allow suppression to be kept lowest possible while removing all echoes. The lower the suppression, the better the full-duplex communication during double-talk. Full-duplex communication here means that the remote speaker hears if the near speaker wishes to interrupt him or makes a brief comment while the remote speaker is active. A further advantage of the control of $s_{high}$ at the start, according to the invention, is that at the beginning of a telephone conversation echoes are prevented with absolute reliability. During this time, the full-duplex capability from the near to the remote speaker is restricted, but this is not a disadvantage since in the first seconds of a telephone call double-talk seldom occurs, but rather each participant initially states his name or a greeting.

The invention claimed is:

1. A telephone echo reduction devices, having:
   an echo reduction unit (4), disposed between an input channel (1) for receiving an input audio signal (A1) coming from a remote telephone, and an output channel (5) for outputting an output audio signal (A2), and providing for the variable suppression of any echo signal contained in the output audio signal (A2) according to an echo suppression factor (s) at a control input,
   a speech activity detection unit (7) for detecting any speech signal in the input audio signal (A1), wherein, said echo suppression factor (s) is set maximum if a speech signal is detected, and,
   a control unit (6) connected to an input control of the echo reduction unit (4), and when the speech activity detection unit (7) indicates no speech signal is being detected, then providing for the echo suppression factor (s) to be gradually and smoothly exponentially decayed from maximum to minimum over a time profile;
   wherein, any reverberation echoes that would otherwise occur are reduced.

2. The device of claim 1, wherein, the control unit (6) provides for the echo suppression factor (s) to be exponentially decayed in accordance with the function $$s[k]=\alpha \cdot s[k-1]+(1-\alpha) \cdot s_{low},$$

wherein s[k] is the echo suppression value at time k, $\alpha$ is a factor representing the exponential reduction behavior and $s_{low}$ is a minimum echo suppression value.

3. The device of claim 2, wherein, the control unit (6) provides for the minimum suppression value $s_{low}$ is in the range 0.1 to 1, and the factor $\alpha$ representing the exponential reduction is in the range of 0.5 to 0.99.

4. The device of claim 1, wherein, the control unit (6) provides for time delay of the reduction of the echo suppression factor (s) from 0.1 to 1 second.

5. The device of claim 1, further comprising:
   a second speech activity detection unit (427) for detection of a speech signal in an echo reduced audio signal (r) fed to the echo reduction unit (4) and coming from a near end;
   wherein, said echo suppression factor (s) is set to a maximum suppression value if the input audio signal has a speech signal and the echo reduced audio signal (r) does not have a speech signal, and;
   wherein, the echo suppression factor (s) is set to a medium echo suppression value if the input audio signal (A1) and the echo-reduced audio signal (r) both has a speech signal.

6. The device of claim 1, further comprising:
   an adaptive FIR echo filter (40) for determining an estimated echo signal (e) in which coefficients of the adaptive FIR echo filter (40) are initialized at the start of reception of input audio signal (A1) to non-zero.

7. The device of claim 6, wherein, the control unit (6) provides for the echo suppression factor (s) to initially be set to a maximum at the start of the reception of the input audio signal (A1) and then reduced if a speech signal remains present in the input audio signal (A1).

8. The device of claim 7, wherein, the control unit (6) provides for said reduction in initial echo suppression factor (s) over time to approximate the adaptation duration of the adaptive FIR echo filter (40).

9. A method for reducing echo in the transmission of audio signals, in particular in uttered speech, having the steps of:
   echo suppression for suppressing an echo signal (A1) of an input audio signal (A1) contained in an output audio signal (A2),
   detection of a speech signal contained in the input audio signal (A1), and
   setting of an echo suppression factor (s) for the suppression of echo,
   characterized in that the echo-suppression factor (s) is reduced gradually and continuously exponentially decayed maximum from a echo-suppression value set while a speech signal is present in the input audio signal (A1) to a minimum echo-suppression value if it is detected that the input audio signal (A1) does not contain any speech signal.

* * * * *